(12) United States Patent
Newman et al.

(10) Patent No.: US 11,129,399 B2
(45) Date of Patent: Sep. 28, 2021

(54) IN-LINE CRYOGENIC METHOD AND SYSTEM FOR COOLING LIQUID PRODUCTS

(71) Applicant: Messer Industries USA, Inc., Bridgewater, NJ (US)

(72) Inventors: Michael D. Newman, Hillborough, NJ (US); Scott Madsen, Burr Ridge, IL (US)

(73) Assignee: Messer Industries USA, Inc., Wilmington, DE (US)

( * ) Notice: Subject to any disclaimer, the term of this patent is extended or adjusted under 35 U.S.C. 154(b) by 167 days.

(21) Appl. No.: 15/237,764

(22) Filed: Aug. 16, 2016

(65) Prior Publication Data

US 2018/0049451 A1    Feb. 22, 2018

(51) Int. Cl.
*A23L 3/375* (2006.01)
*A23L 23/00* (2016.01)
*A23L 3/36* (2006.01)
*F25B 19/00* (2006.01)
*F25D 29/00* (2006.01)

(52) U.S. Cl.
CPC .............. *A23L 3/375* (2013.01); *A23L 3/361* (2013.01); *A23L 23/00* (2016.08); *F25B 19/005* (2013.01); *F25D 29/001* (2013.01); *F25D 29/005* (2013.01); *A23V 2002/00* (2013.01); *F25D 2400/28* (2013.01); *F25D 2600/04* (2013.01); *F25D 2700/16* (2013.01)

(58) Field of Classification Search
CPC .............. F25D 3/10; A23L 3/375; A23D 7/05
See application file for complete search history.

(56) References Cited

U.S. PATENT DOCUMENTS

| | | | |
|---|---|---|---|
| 5,394,704 A * | 3/1995 | Johnson | F17C 13/026 62/122 |
| 5,526,696 A | 6/1996 | Cappi | |
| 5,878,582 A * | 3/1999 | Appolonia | A23L 3/362 62/63 |
| 2006/0283196 A1 | 12/2006 | Rosenbaum et al. | |
| 2008/0289357 A1 | 11/2008 | Skobel et al. | |
| 2013/0152608 A1 | 6/2013 | Wray | |
| 2014/0230460 A1 * | 8/2014 | Newman | F25D 17/005 62/52.1 |
| 2016/0270433 A1 | 9/2016 | Lilakos et al. | |

OTHER PUBLICATIONS

International Search Report for PCT/US2017/45481, dated Dec. 11, 2017, Authorized Officer: Lee W. Young, 11 pgs.
Written Opinion of International Searching Authority for PCT/US2017/45481, dated Dec. 11, 2017, Authorized Officer: Lee W. Young, 5 pgs.
European Search Report for EP 16 204 197.4, dated Jun. 23, 2017, 5 pages.

* cited by examiner

*Primary Examiner* — John F Pettitt, III
(74) *Attorney, Agent, or Firm* — Joshua L. Cohen

(57) ABSTRACT

Disclosed are an in-line direct cryogenic method and system for cooling heated fluid food products, such as sauces. The method includes injecting cryogen directly into the fluid to be cooled while the flow rate of the fluid to be cooled is adjusted in response to downstream temperature measurements and while maintaining the injection rate of the cryogen into the fluid. According to the method the flow of the sauce is adjusted during the flow of the cryogen to achieve process stability, product uniformity and efficient use of the cryogen.

5 Claims, 2 Drawing Sheets

IN-LINE CRYOGENIC METHOD AND SYSTEM FOR COOLING LIQUID PRODUCTS

BACKGROUND

The present embodiments relate to a method and system for rapidly reducing the temperature of liquid products such as, without limitation, in the food processing and preparation industries. The method and system can be used to rapidly reduce the temperature of liquid food products such as, without limitation, sauces, soups, marinades, dairy or other heated or pasteurized liquids.

During the preparation of liquid food products, such as sauces, the sauce is heated to a temperature of about 190° F. (88° C.). The sauce must then be cooled as rapidly as possible to achieve food safety requirements and to preserve product quality. For example, increased cooling speeds of sauces reduces bacterial growth on the product. Rapid cooling of sauce products also allows for greater production of same and greater flexibility to process high heat load input products.

Nearly all cryogenic chilling and freezing applications utilize a modulating control valve in the cryogen pipeline to adjust the flow of cryogen entering the process to control the overall process temperature. It is known to input a desired set point temperature for the process into a control system, and to control flow of liquid cryogen entering the process until a desired set point temperature is reached. Once the set point temperature has been reached the modulating control valve begins closing and a Proportional Integral Derivative (PID) control loop is employed to adjust cryogen flow to maintain steady state conditions.

Known chilling methods for sauces employ chill rates up to 30 gallons per minute (GPM) from about 190° F. (88° C.) to about 40° F. (4° C.). The use of the modulating control valve in conjunction with known control methods are not useful for this rapid chilling of food products. The chilling process is so rapid that the use of a modulating control valve with a standard PID control loop cannot be responsive enough. The rapid cooling produced by the cryogen injector (eg, 190° F. to 40° F. in about 2.6 seconds) makes impossible temperature control by known conventional methods using a modulating control valve on the cryogen pipeline feeding the cryogen injector. This conventional control is too slow to react to changing sauce and liquid cryogen quality conditions. Physical and mechanical limitations of the modulating control valve and inherent lags resulting from numerous control components, process analysis, and variability in the quality of the incoming cryogen make the known control methods impossible to utilize in very rapid chilling methods.

SUMMARY

The present embodiments relate to a method for rapid cooling of fluids including providing a source of fluid to be cooled, flowing the fluid to be cooled through a pipeline, injecting cryogen into the fluid, first measuring a temperature of the flowing fluid in the pipeline with a first temperature sensor after the injecting the cryogen, second measuring the temperature of the flowing fluid with a second temperature sensor after the first measuring; and adjusting a flow rate of the fluid through the pipeline responsive to a difference between temperature measurements of the first and second temperature sensors while maintaining a rate of the injecting of the cryogen and maintaining a temperature difference between the first and second temperature sensors.

According to certain illustrative embodiments, the injecting of the cryogen and maintaining a temperature difference between the first and second temperature sensors are each at a substantially constant rate. According to further illustrative embodiments, the injecting of the cryogen and maintaining a temperature difference between the first and second temperature sensors are each at a select constant rate.

The present embodiments further relate to a system for rapid cooling of fluid including a source of fluid to be cooled, a pipeline for flowing the fluid, a pump in fluid communication with the pipeline for flowing the fluid, a source of cryogen, a cryogen injector located downstream from the pump and in fluid communication with the pipeline to inject cryogen into the fluid, a first temperature sensor located downstream from the cryogen injector in communication with the flowing fluid in the pipeline, a collection vessel for collecting the flowing fluid and located downstream from the first temperature sensor, a second temperature sensor located downstream from the first temperature sensor and in communication with the fluid in the collection vessel, and a controller in communication with the pump and the first and second temperature sensors, the controller responsive to a signal from each of said first and second sensors for adjusting speed of the pump to control the flowing fluid.

BRIEF DESCRIPTION OF THE DRAWINGS

The accompanying drawings are included to provide a further understanding of the apparatus and method provided herein and are incorporated in and constitute a part of this specification. The drawings illustrate embodiments of the apparatus and method provided herein and, together with the description, serve to explain the principles described herein but are not intended to limit the specification or any of the claims.

DETAILED DESCRIPTION OF THE ILLUSTRATIVE EMBODIMENTS

Figure 1:
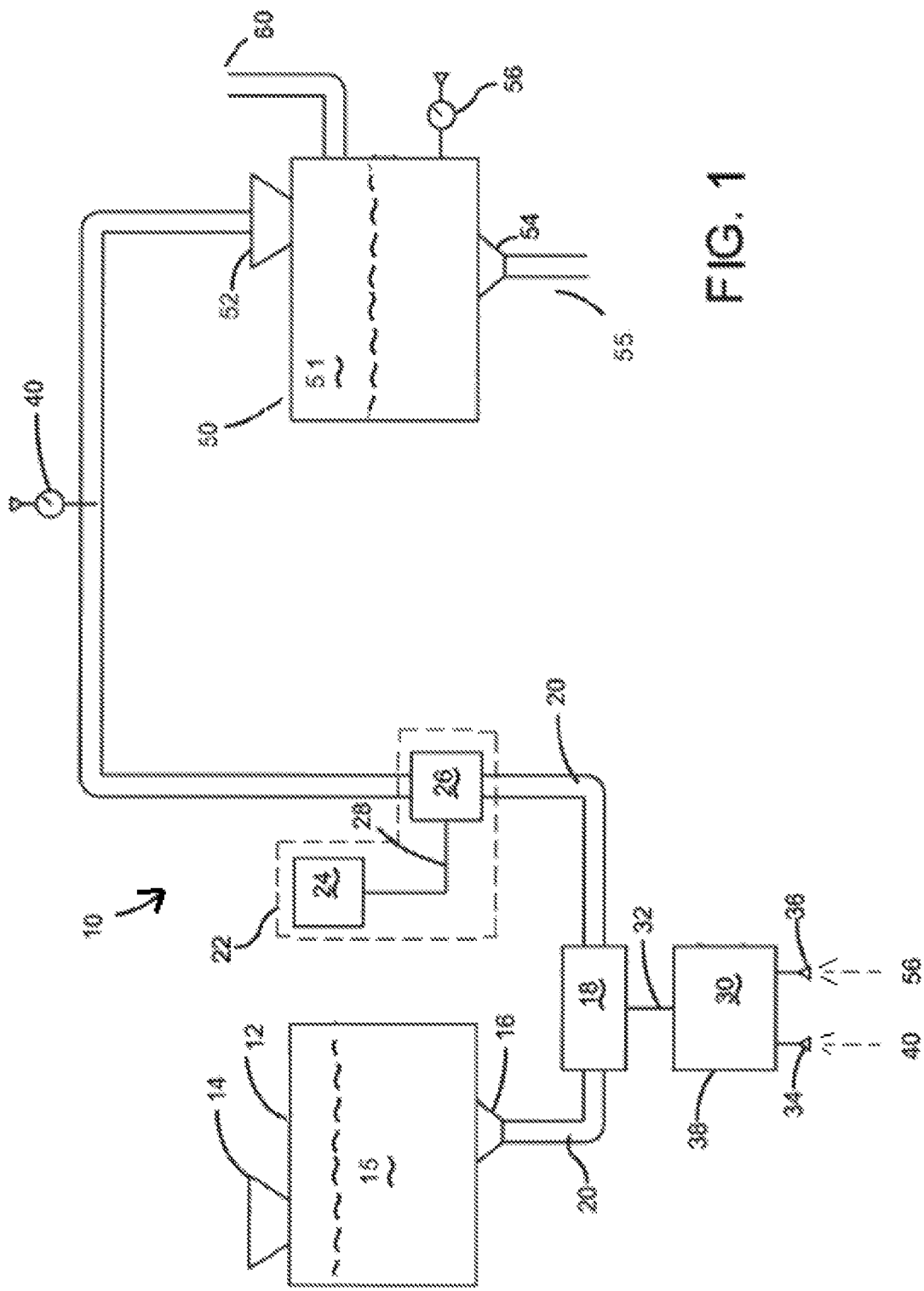
FIG. 1 shows an illustrative embodiment of the in-line direct cryogen cooling apparatus.

Provided herein is a method for the rapid, continuous in-line cooling of a fluid, which includes pumping the fluid to be cooled using a pump, cooling the fluid in-line by injecting cryogen into the fluid at a substantially constant rate, sampling the temperature at various locations in the system, and adjusting the flow of the fluid being cooled. The temperature readings are transmitted to a controller, which varies the speed of the pump in order to maintain a constant temperature difference between different locations in the system. Thus, the flow rate of the fluid, such as a sauce, is controlled to meet desired temperatures. The present control method and system eliminates the need for a modulating control valve in the cryogen pipeline and eliminates the lag associated with conventional control methods.

According to certain illustrative embodiments, during the in-line direct cryogenic cooling method, a sauce, for example, is pumped from a cooking vessel through an in-line pump and in-line cryogen injector, and into a cooling vessel where it may be slowly mixed to achieve the final equilibrated temperature for the sauce.

Also provided is an apparatus for reducing the temperature of a liquid product in a processing line, the system including a source of fluid to be cooled, a pump in communication with the source, a cryogen injector configured to inject cryogen at a select rate into the fluid, and a plurality of temperature sensors. The select rate may be a substantially constant rate or a constant rate of injecting of cryogen into the flowing fluid. The temperature sensors are configured to transmit data to at least one controller. The controller varies the speed of the pump in order to maintain a constant temperature difference between the two sensors.

The present embodiments relate to a method for rapid cooling of fluids such as food products in the food preparation and processing industries. The process includes providing a source of fluid to be cooled. The fluid to be cooled is flowed such as, for example, by pumping the fluid to be cooled through a pipeline. A suitable cryogen is injected directly into the fluid that is flowing through the pipeline and comes into direct contact with the fluid to cool it. The cryogen is injected into the fluid at a substantially constant rate throughout the cooling process.

To maintain steady state conditions during the cooling process, the temperature of the fluid being cooled is measured by temperature sensors located downstream from the cryogen injector. The temperature of the flowing fluid in the pipeline is first measured by a first temperature sensor after injecting the cryogen into the fluid. The temperature of the flowing fluid is measured with a second temperature sensor located downstream from the first temperature sensor and occurs after measuring the temperature of the flowing fluid with the first temperature sensor. The first and second temperature sensors transmit signals representing the temperature measurements to a controller. The controller analyzes the temperature measurement data transmitted to and received by the controller from the first and second temperature sensors and adjusts the flow rate of the fluid through the pipeline. The flow rate of the fluid through the process is therefore adjusted based on the difference between the temperature measurements of the first and second temperature sensors. The flow rate of the fluid through the process can be adjusted maintaining the substantially constant injection rate of the cryogen into the fluid to maintain a substantially constant temperature difference between the first and second temperature sensors and therefore maintain steady state conditions of the process.

The present embodiments further relate to a system for rapid cooling of fluids. The system includes a source of fluid to be cooled, which can be a container, housing, tank or other vessel, containing a heated fluid such as a heated sauce. The system includes a pipeline for flowing the fluid to be cooled through the system. A pump is provided in fluid communication with the fluid source for pumping the fluid to be cooled through the system. A collection or destination container, housing, tank or other vessel is provided for collecting fluid that has been cooled by the cooling system and process.

The in-line direct cooling apparatus includes a cryogen injection system. The cryogen injection system includes a suitable source of cryogen for cooling the fluid flowing through the process. The cryogen source may be a container, housing, tank, or other vessel suitable for holding cryogen until it is injected into the pipeline and enters the process. The cryogen source and cryogen collector are in fluid communication with a suitable cryogen pipeline extending between these two components of the apparatus. The cryogen injector is coupled in-line with the fluid pipeline of the apparatus and is positioned downstream from the pump. The cryogen injector is configured to inject cryogen into the flowing fluid at a substantially constant rate. According to alternative illustrative embodiments, more than one in-line cryogen injector may be used in the cooling system and method.

According to the present embodiments, without limitation, and only by way of example, the suitable cryogen for cooling the fluid may be selected from nitrogen, carbon dioxide, and mixtures thereof. The term "cryogen" refers to a cooling substance having a temperature of about $-320°$ F. ($-196°$ C.) to about $0°$ F. ($-18°$ C.) prior to being injected into the pipeline and coming into direct contact with the flowing fluid to be cooled. The cryogen can be injected directly into the fluid flowing through the system by an injector, lance or one or more nozzles. The use of the cryogen is an open or direct cooling system and this direct injection step produces a convective interaction between the extremely cold cryogen and the hot fluid or sauce which allows for a faster heat transfer at the product and produces a warm cryogen gas. According to certain illustrative embodiments, the cryogen may be liquid nitrogen.

Temperature sensors are coupled to the pipeline and collection vessel for measuring the temperature of the fluid at different points or locations during the cooling process, and used in a feedback control loop to control steady state conditions of the cooling process. The controller is coupled to the temperature sensors and to the pump to control and adjust the speed of the pump during the cooling process.

According to illustrative embodiments, a first temperature sensor is located downstream from the cryogen injector. The first temperature sensor is in communication with the pipeline and is coupled to the controller for communicating temperature measurements back to the controller. A second temperature sensor is located downstream from the first temperature sensor and is in communication with the collection vessel. The second temperature sensor is also coupled to the controller for communicating temperature measurements back to the controller.

Based on the temperature measurements transmitted to the controller by the first and second temperature sensors, the controller controls the flow rate of the fluid through the apparatus. The controller may control the flow rate of the fluid by means of, without limitation, a pump or valve. The pump may be a positive displacement pump, and the controller may be a proportional integral (PI), proportional derivative (PD), proportional integral derivative (PID), model predictive control (MPC), or Markov-chain type controller. According to certain illustrative embodiments, the sauce is cooled to maintain a substantially constant temperature change by altering the speed of a positive displacement pump with a PID controller.

The apparatus and method may further include an exhaust gas outlet for exhausting cryogen gas from the apparatus that was generated during the cooling method. The exhaust outlet to the outside environment vents the spent cryogen gas which has picked up both heat and moisture from the product being cooled. The exhaust gas outlet may include an outlet port that is in fluid communication with the collection vessel for the cooled sauce. According to alternative embodiments, the exhaust gas outlet may be in fluid communication with the fluid pipeline upstream from the collection vessel.

Before explaining the inventive embodiments further in detail, it is to be understood that the invention is not limited in its application to the details of construction and arrangement of parts illustrated in the accompanying drawings, if any, since the invention is capable of other embodiments and being practiced or carried out in various ways. Also it is to be understood that the phraseology or terminology employed herein is for the purpose of description and not of limitation.

FIG. 1 shows an illustrative embodiment of the direct in-line cryogen cooling apparatus 10. In-line cooling apparatus 10 comprises a first cooking tank 12 for holding a quantity of food product 15, such as a heated sauce, to be cooled by the apparatus and method. The first tank 12 comprises a food product inlet 14 for receiving a quantity of food product. The first tank 12 also comprises a food product outlet 16 for releasing heated food product from the first tank 12 to be cooled to pipeline 20. The first tank 12 is in fluid communication with pump 18 for conveying the heated food product from the first tank 12 to a cryogen injector 26 through pipeline 20. The pump 18 is positioned in-line with the pipeline 20. The pump 18 for conveying the heated food product from the first tank 12 to the cryogen injector 26 may be a positive displacement pump. The pump 18 is controlled by a mechanical and/or electrical controller 30 and electrically coupled 32 to the controller 30.

The sauce flowing through pipeline 20 is pumped by pump 18 through another length or section of pipeline 20 and then through cryogen injector 26 where the sauce is subjected to cryogen that is being injected at a constant rate into pipeline 20.

Cryogen injection system 22 includes a source of cryogen 24 that is in fluid communication with a cryogen injector 26 through a cryogen pipeline 28. The cryogen may be, for example, and without limitation, liquid nitrogen (LIN). The cryogen injector 26 is constructed and arranged to inject the cryogen directly into the heated food product flowing through pipeline 20. The cryogen injector 26 is positioned in-line with pipe 20 and injects cryogen directly into the pipe 20, thereby eliminating the need for jackets or other external heat exchangers. The cryogen injected into the pipeline 20 comes into direct contact with the fluid flowing through the pipeline 20. The cryogen injection system 22 injects cryogen into the pipe 20 at a substantially constant rate, thereby eliminating the need for operational calculation or control of the cryogen injection rate during the in-line direct cooling process and/or with modulating control valves.

The in-line cooling apparatus 10 also includes a second collection tank 50 (ie, an equilibration tank). The second tank 50 is constructed and arranged downstream of the system 22 to collect or otherwise receive cooled food product through pipeline 20. The second tank 50 includes a food product inlet 52 in fluid communication with pipeline 20. The cooled sauce is exhausted from the cryogen injector 26 into another length of pipeline 20 which extends to the inlet 52 of the second tank. The second tank 50 also includes a food product outlet 54 for releasing cooled food product into pipe 55 for subsequent downstream further processing or packaging. According to alternative embodiments, food product may be returned to the first tank 12 or the pipeline 20 from the pipe 55 for another round of cooling with the cryogen injection system 22. The second tank 50 further includes an exhaust outlet 60 for exhausting cryogen gas 51 that was generated during the in-line direct cryogen cooling method. The second tank 50 additionally includes a second temperature sensor 56 configured to measure the temperature of the food product that has entered tank 50 through inlet 52. The second tank 50 may also be provided with a lid for sealing and for accessing the interior of the tank.

The first temperature sensor 40 is positioned downstream from cryogen injector 26. The first temperature sensor 40 is constructed and arranged to measure the temperature of the flowing food product through the section of the pipe 20 in the region of the temperature sensor 40. The second temperature sensor 56 is located downstream from the first temperature sensor 40 and is in communication with the collection tank 50.

The temperature measurements taken by the first 40 and second 56 temperature sensors are transmitted to controller 30. The controller 30 is constructed and arranged to adjust the speed of the pump 18 in order to adjust the flow rate of the food product through the apparatus 10 while still maintaining the select injection rate, such as a substantially constant or constant injection rate, of the cryogen from the cryogen source 24 into the pipeline 20. Controlling the flow rate of the food product provides a constant, user-defined target difference in temperatures measured by the temperature sensors 40, 56.

The pump 18 is in fluid communication with the first tank 12. The pump 18 is configured to receive data from the controller 30 via the controller output 32 and can adjust the flow rate of the food product through the pipe 20. If the controller 30 detects that the temperature difference between the temperature sensors 40, 56 is too small, then the controller 30 will slow the pump 18 in order to increase the residence time of the cryogen with the fluid food product in the pipe 20. Slowing down the pump 18 thereby results in an increase in the magnitude of the temperature difference between the temperature sensors 40, 56. If the controller 30 detects that the temperature difference between the temperature sensors 40, 56 is too large, then the controller 30 will increase the flow rate of the fluid food product through the pump 18 in order to decrease the residence time of cryogen with fluid food product in the pipe 20. Increasing the flow rate of food product through pump 18 results in a decrease in the difference of the magnitude of temperature difference between the temperature sensors 40, 56.

By way of a specific example, but not limitation, the first temperature sensor 40 measures the downstream temperature of a sauce being cooled. Based upon properties of the sauce, it is known that a bias $\Delta T$ of about 30° F. (about −1.1° C.) to about 40° F. (about 4.4° C.) is required at the control point for the temperature sensor 40. If a desired equilibrated sauce temperature of about 40° F. is required, then the control point for the temperature sensor 40 would be 70° F. (40° F.+30° F.). After the cooling process has run for several minutes, a temperature measurement of the sauce that has been received into the second tank 50 is taken with the second temperature sensor 56 to indicate the final equilibrated temperature of the sauce. To achieve the final desired equilibrated temperature of the sauce and to maintain steady state conditions of the process, the induced temperature bias at the control point of the first temperature sensor 40 is adjusted in real time. For example, if the temperature measurement taken by the second temperature sensor 56 of the sauce in the second tank 50 is 45° F. instead of the target 40° F., then the bias $\Delta T$ at the control point of the first temperature sensor 40 is reduced by 5° F. in real time. This automatically and in real-time resets the set point temperature for the control point of first temperature sensor 40 to 65° F. (40° F.+25° F.). The method and system is therefore capable of self-adjusting in real-time based on the temperature conditions experienced during the cooling cycle.

Figure 2:
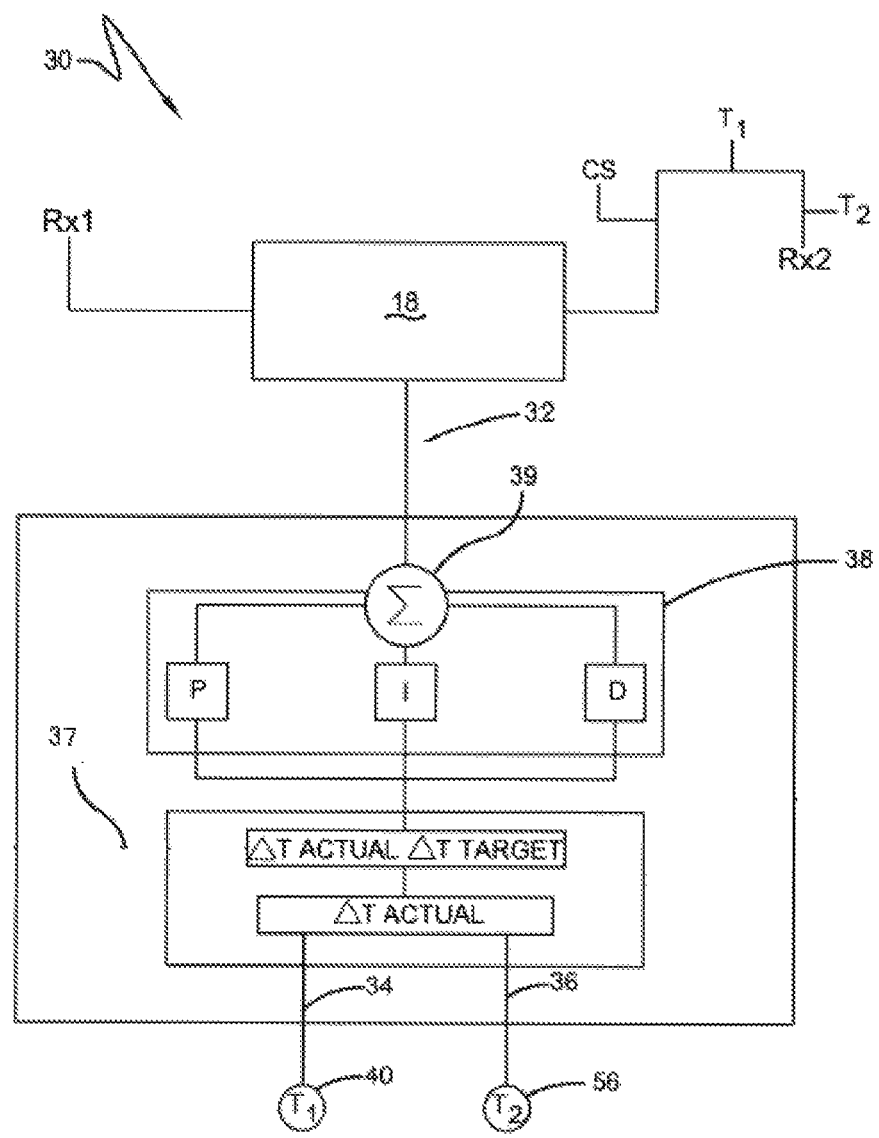
FIG. 2 is a schematic representation of an illustrative embodiment of the logic of the controller of the in-line direct cryogen cooling apparatus.

FIG. 2 illustrates the controller 30 comprising data inlets 34, 36, the controller output 32, and user-defined data inlet 38. The controller output 32 is in communication with the pump 18 in order to adjust the speed of the pump 18 to maintain a constant, user-defined target difference in temperature between the temperature sensors 40, 56. The controller 30 further comprises a comparison unit 37 for calculating the difference between the user-defined target difference in temperature (ΔT-target) between the temperature sensors 40, 56, and the real-time measured temperature difference between the same (ΔT-actual). Any error calculated by the comparison unit 37 is transmitted to a composite PID unit 38 in electric communication with the comparison unit 37. The composite PID unit 38, after calculating the summation of the error correction signals generated by each of the other components in summation unit 39, transmits a signal to the pump 18 in order to automatically adjust a speed of the pump 18 in order to maintain a constant, user-defined target difference in temperature between the sensors 40, 56.

The temperature measurements transmitted to the controller 30 by the temperature sensors 40, 56 are first compared in the comparison unit 37 in order to obtain a ΔT-actual according to the formula:

$$\Delta T\text{-actual} = \text{Temperature at sensor 56} - \text{Temperature at sensor 40}$$

This ΔT-actual is then transmitted to a second phase of the comparison unit 37 in order to compare the ΔT-actual with the user-defined, target ΔT-target, which is programmed into the controller 30 through user-defined input 34. Comparison of ΔT-actual and ΔT-target in comparison unit 37 produces the value of the error function at any given point in time according to the equation:

$$\text{Error}(t) = \Delta T\text{-target} - \Delta T\text{-actual}$$

If the controller 30 is a standard PID controller as shown in FIG. 2, the value of Error(t) is transmitted to three separate portions of the composite PID unit 38. The composite PID unit 38 performs three distinct calculations with Error(t), a proportional portion according to the expression:

$$Kp * \text{Error}(t);$$

an integral portion according to the expression:

$$Ki * \int_0^t \text{Error}(t)\, dt;$$

and a derivative portion according to the expression:

$$Kd * d(\text{Error}(t))/dt;$$

wherein Kp, Ki, and Kd are numerical constants representing relative weights given to various portions of the composite PID unit 38 multiplied by each portion. Each of the individual portions are summed in the PID summation portion 39, and transmitted via controller output 32 to pump 18, in order to maintain a constant, user-defined temperature difference between sensors 40, 56.

The present embodiments provide for a faster and more efficient chilling of the liquid product for increase production with less contamination of same. The present embodiments also provide for greater flexibility of any processing system to which the embodiments are connected, increase productivity and flexibility with respect to high liquid products being input into the system and of course a greater range of liquid products can now be acted upon by the system.

Because of the manner by which the liquid product is mixed, product temperature consistency is improved so that the resulting pull down rate of the liquid product provides for an improved product quality while at the same time reducing product waste. The present embodiments also provide for a more effective and efficient use of the cryogen coolant.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. An apparatus for cooling a fluid food product, comprising:
   a source of a fluid food product to be cooled;
   a pipeline for flowing the fluid food product from the source;
   a pump in fluid communication with the pipeline for the flowing of the fluid food product;
   a source of cryogen;
   a cryogen injector located downstream from the pump and in fluid communication with the pipeline and with the cryogen source to inject the cryogen from the cryogen source at a select constant rate into the flowing fluid food product;
   a first temperature sensor located downstream from the cryogen injector and in communication with the flowing fluid food product in the pipeline for measuring a first temperature of the flowing fluid food product;
   a collection vessel located downstream from the first temperature sensor for collecting the flowing fluid food product from the pipeline;
   a second temperature sensor located downstream from the first temperature sensor and in communication with the flowing fluid food product in the collection vessel for measuring a second temperature of the flowing fluid food product in the collection vessel; and
   a controller in communication with the pump and the first and second temperature sensors, the controller constructed and arranged to receive and analyze the first temperature and the second temperature to determine a sensed temperature difference, comparing the sensed temperature difference to a constant user-defined target temperature difference, and adjusting a speed of the pump in response to the comparing to achieve the constant user-defined target temperature difference.

2. The apparatus of claim 1, wherein said pump comprises a positive displacement pump.

3. The apparatus of claim 1, wherein the cryogen is selected from the group consisting of nitrogen, carbon dioxide, and mixtures thereof.

4. The apparatus of claim 3, wherein the nitrogen comprises liquid nitrogen.

5. The apparatus of claim 1, further comprising an exhaust for cryogen gas generated during cooling of the flowing fluid food product.

\* \* \* \* \*